(12) United States Patent
Rodriguez et al.

(10) Patent No.: US 11,886,460 B2
(45) Date of Patent: Jan. 30, 2024

(54) MULTIPLE VERSION DATA CLUSTER ETL PROCESSING

(71) Applicant: Hitachi Vantara LLC, Santa Clara, CA (US)

(72) Inventors: Angelo Manuel Rodriguez, Cocoa, FL (US); Jacob Russell Gminder, Sanford, FL (US); Angel Luis Ramos Cardona, Orlando, FL (US)

(73) Assignee: HITACHI VANTARA LLC, Santa Clara, CA (US)

( * ) Notice: Subject to any disclaimer, the term of this patent is extended or adjusted under 35 U.S.C. 154(b) by 0 days.

(21) Appl. No.: 17/795,905

(22) PCT Filed: Jan. 31, 2020

(86) PCT No.: PCT/US2020/016002
§ 371 (c)(1),
(2) Date: Jul. 28, 2022

(87) PCT Pub. No.: WO2021/154271
PCT Pub. Date: Aug. 5, 2021

(65) Prior Publication Data
US 2023/0104101 A1    Apr. 6, 2023

(51) Int. Cl.
*G06F 16/25* (2019.01)
*G06F 8/71* (2018.01)
*G06F 9/445* (2018.01)

(52) U.S. Cl.
CPC .............. *G06F 16/254* (2019.01); *G06F 8/71* (2013.01); *G06F 9/44521* (2013.01)

(58) Field of Classification Search
None
See application file for complete search history.

(56) References Cited

U.S. PATENT DOCUMENTS 9,411,864 B2 *   8/2016  Glider .................... G06F 40/151
2013/0275363 A1* 10/2013  Wu ........................... G06F 9/46
                                                                707/602

(Continued)

OTHER PUBLICATIONS

Casters, Matt, et al., "Pentaho Kettle Solutions: Building Open Source ETL Solutions with Pentaho Data Integration", 2010, WIley Publishing, 722 pages. (Year: 2010).*

(Continued)

*Primary Examiner* — Scott A. Waldron
(74) *Attorney, Agent, or Firm* — MATTINGLY & MALUR, PC (57) ABSTRACT

In some examples, a computing device is able to communicate with a plurality of data clusters. For example, a first data cluster may be configured with a first version of data cluster software including a first library version, and a second data cluster may be configured with a second version of data cluster software including a second library version that is different from the first. The computing device may execute a single instance of an application to send, based at least on information in the first library version, to the first data cluster, a request for first data, and may receive the first data from the first cluster. Further, the computing device may send, based at least on information in the second library version, second data that is based on the first data to the second data cluster to store the second data with the second data cluster.

15 Claims, 8 Drawing Sheets

(56) References Cited

U.S. PATENT DOCUMENTS

2017/0031929 A1    2/2017   MacKay et al.
2017/0185661 A1    6/2017   Belyy et al.
2018/0173774 A1    6/2018   McPherson et al.
2019/0317944 A1   10/2019   Deremigio et al.
2020/0035346 A1    1/2020   Xavier et al.

OTHER PUBLICATIONS

Pentaho Corporation, "Getting Started with Pentaho Data Integration", 2012, 41 pages. (Year: 2012).*
Pentaho Corporation, "Pentaho Data Integration Administrator's Guide", 2012, 56 pages. (Year: 2012).*
International Search Report of PCT/US2020/016002 dated Apr. 24, 2020.

* cited by examiner

FIG. 8

MULTIPLE VERSION DATA CLUSTER ETL PROCESSING

TECHNICAL FIELD

This disclosure relates to the technical field of ETL processing.

BACKGROUND

ETL (Extract, Transform, Load) processing may typically include extracting data from one or more data sources, sometimes transforming the data in some manner, such as to make the data compatible for an intended use, and loading the data to a target location, such as a data warehouse or other repository. ETL processes are commonly used to gather, consolidate or otherwise integrate data from multiple different data sources, repositories, or the like. Examples of data sources and repositories may include databases, data warehouses, big data storage clusters, and so forth. However, performing an ETL process with multiple different data cluster sources and targets can be challenging. For instance, if an ETL process utilizes multiple different data clusters, each of which may employ a different version of data cluster software or the like, the ETL process might not be able to be executed to completion from within the same application instance, such as due to conflicts between the different versions. For instance, in such situations, it may be necessary to divide the execution of the ETL process among the various different data cluster versions, limit the scope of the ETL sources/targets to only those sources/targets that are known to be compatible, or impose other undesirable limitations.

SUMMARY

Some implementations include a computing device able to communicate with a plurality of data clusters. For example, a first data cluster may be configured with a first version of data cluster software including a first library version, and a second data cluster may be configured with a second version of data cluster software including a second library version that is different from the first. The computing device may execute a single instance of an application to send, based at least on information in the first library version, to the first data cluster, a request for first data, and may receive the first data from the first cluster. Further, the computing device may send, based at least on information in the second library version, second data that is based on the first data to the second data cluster to store the second data with the second data cluster.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DESCRIPTION OF THE EMBODIMENTS

Some implementations herein are directed to techniques and arrangements for enabling a single instance of an ETL execution application to execute multiple ETL operations successively and/or concurrently with a plurality of different data cluster implementations executing different software versions for extracting, transforming and loading data. Examples herein provide a solution that includes the ability to execute an ETL process from start to end with a plurality of non-homogeneous data clusters within a single ETL execution application. For instance, the single ETL execution application may be able to execute the ETL process including a plurality of ETL operations with a plurality of different data cluster implementations, respectively, such as data clusters that are configured using different software versions (e.g., provided by different entities) and having corresponding different software libraries.

As one example, each ETL operation (e.g., discrete step) in an ETL process may be performed by interacting with or otherwise accessing a data cluster implementation that is different from data cluster implementations accessed in the other ETL operations. Accordingly, the ETL execution application may perform the multiple ETL operations of the ETL process without having to split or distribute the execution of the ETL process, thereby substantially improving the efficiency and ease of implementing the ETL process.

In some examples, the data cluster implementations accessed during execution of the ETL processes herein may store, manage, or otherwise maintain big data that may include data that comes from business functions, such as through a company's practices and procedures, human data generated from communications, and so forth. Other examples of big data may include database data, demographic data, machine-generated data, such as may be produced by the world's infrastructure systems, various types of sensors of weather, time, location, and so forth. Numerous other types of data will be apparent to those of skill in the art, and implementations herein are not limited to any particular type of data. According to some estimates, 80 percent of all big data may be unstructured data that may require some processing, normalizing, or other transformation to be able to provide useful business insights. Furthermore, the volume and variety of big data has been increasing dramatically as has the number of sources of this data.

In some examples herein, the data clusters may be big data clusters, which are a type of computational cluster that is able to store and, in some cases, analyze huge amounts of unstructured data in a distributed computing environment. One of the most well-known types of big data clusters is the HADOOP data cluster. Accordingly, in some cases, at least some of the different data cluster implementations herein may include HADOOP big data clusters employing various different configurations of HADOOP data storage, and which may further include HADOOP libraries and HADOOP distributed file systems (HDFSs).

In some cases, the data clusters herein may be configured with HADOOP open source distributed processing software on a group of configured computers as at least a portion of the respective data cluster. For instance, one or more computing devices in the data cluster may provide management functions for the other computing devices in the data cluster. The other computing devices in the data cluster may act as storage and processing nodes. HADOOP data clusters may be referred to as "shared nothing" systems because the computing devices in the data cluster may typically store data and process data independently of each other.

The data clusters herein may be implemented with any of a plurality of different versions of software and libraries provided by various different distribution entities. For example, a number of different distribution entities may provide data cluster platforms with their own implementations of the HADOOP framework, such as CLOUDERA Distribution for Hadoop, HORTONWORKS Data Platform and MAPR Distribution, and which may be opensource software in some cases. Each of the various distribution entities may utilize their own HADOOP libraries, which may each be a different library version from the library versions employed by the other distribution entities. Accordingly, data cluster requests generated from a first version of a HADOOP library used by a first distribution entity may not be compatible for use with a second version of a HADOOP data cluster implemented with software from a second distribution entity. Furthermore, in some cases, even different release versions from the same distribution entity may not be entirely compatible with each other.

Some examples herein are able to employ a plurality of different HADOOP library versions during the execution of an ETL process from within a single instance of an ETL execution application by implementing versioned class loaders that able to host particular ones of the plurality of different HADOOP library versions alongside the ETL execution application's main class loader. In addition, some examples include a service layer that can be used by the single instance of the ETL execution application to send information and request actions from the multiple different versions of the HADOOP libraries hosted by the multiple the class loader versions. In some examples, the ETL execution application may be implemented in JAVA programming language, and the main class loader and the versioned class loaders may be JAVA class loaders, although implementations herein are not limited to any particular programming language.

The examples herein enable an ETL execution application to execute an ETL process that includes a plurality of ETL operations performed with a plurality of different data clusters, each of which may be using a different HADOOP library version without having to restart the ETL execution application for using the ETL execution application with different versions of libraries and data clusters. Further, the system may be capable of executing an entire ETL process from within a single instance of an ETL execution application while utilizing multiple HADOOP data clusters configured using various different versions of data cluster platform software from various different distribution entities, including various different library versions. The single instance of the ETL execution application may invoke multiple HADOOP version library modules, each of which may correspond to respective ones of multiple different HADOOP library versions, for enabling access to the multiple data cluster implementations.

In addition, the ETL execution application may extract and/or store data on any of the multiple data cluster implementations during any discrete ETL operation of the ETL process. For example, the instance of the ETL execution application may execute an ETL process that includes multiple ETL operations performed on multiple data clusters, serially and/or concurrently. For example, the ETL execution application may extract data from a first data cluster implementation as a first ETL operation, extract data from a second data cluster implementation as a second ETL operation, and may store data on a third data cluster implementation as a third ETL operation, and each of the first data cluster implementation, the second data cluster implementation, and the third data cluster implementation may require use of a different respective library for interacting with the respective data cluster implementation.

In some examples herein, a service layer implemented at a service computing device that executes the ETL execution application may enable various different versions of the libraries to be utilized side-by-side, either serially or in parallel. In some examples, the ETL execution application may employ a main class loader that communicates ETL operations to the service layer. The service layer may invoke a separate HADOOP version library module for each separate data cluster version and associated HADOOP library version. Further, each version of a library module may have an associated version of a class loader corresponding to one of the library versions. The service layer receives the ETL operation request and routes the ETL operation request to the correct class loader version for the data cluster that is the target of the ETL operation request. The version of the class loader may use the corresponding version library and a corresponding application programming interface (API) for the target data cluster to send the ETL operations request to the target data cluster, and in some cases, may return a result from the target data clusters. The ETL execution application may be able to extract data from any or all of the data cluster implementations when executing a single ETL process by passing a respective ETL operation to the service layer and thereby to a corresponding one of the HADOOP version library modules and class loader version for the HADOOP library version required by the target data cluster to which the ETL operation relates.

When an ETL operation requires interacting with one of the data clusters, which, in turn, requires a specific version of the library corresponding to that data cluster implementation, the ETL execution application may pass the big data request to the service layer for utilizing a corresponding one of the available versions of the library modules. For instance, the versions of the library modules enable separate library versions to coexist on the computing device executing the ETL process without interfering with each other. In particular, different library versions may be incompatible an any number of ways, such as by having different security or authentication requirements, different command structures, different functions associated with classes or other library objects having the same name, and so forth.

Each library module version may have its own class loader version which allows each library module version execute the particular class loader version to handle one respective library version. The class loader version may process a data request using the respective library version and return the results to the main class loader through a service layer program and local API. For example, a class loader version may isolate and locate classes or other library objects within a particular version of a library at runtime. Accordingly, each class loader version may be configured to host a particular library version for locating and utilizing particular library objects from the particular library version during execution of a requested ETL operation with the corresponding data cluster for performing an ETL operation with a target data cluster.

As one example, suppose that a system includes two data clusters, each of which is implemented using a different HADOOP library version, such as from different distribution entities, or the like. Further, suppose that a user wants to execute an ETL process to extract data from the first data cluster and store the results in the second data cluster. In this scenario the ETL execution application may use the service layer to pass a data request to the class loader version hosting the HADOOP library version corresponding to the first data cluster which, in turn, sends the data request to the first cluster based on information obtained from the HADOOP library version. The request may cause the first data cluster to send the requested data to the class loader version, which may provide the requested data to the ETL execution application via the service layer. The ETL execution application may then, if specified by the ETL process, transform the received data based on one or more operations specified in the ETL process. The ETL execution application may then send, through the service layer, the transformed data to a second version class loader of a second version library module hosting a second HADOOP library version corresponding to the second cluster. The second version class loader may use information in the second HADOOP library version to send the transformed data to the second cluster.

As another example, suppose that the ETL process requests data from a plurality of different data cluster versions, each implemented using a different HADOOP library version. Accordingly, similar to the example above, the ETL execution application may execute one or more ETL operations of the ETL process for extracting data from the plurality of different data cluster versions. For example, the ETL execution application may send data requests to the service layer for each different data cluster version from which data is to be extracted. The service layer may direct the requests to the respective versions of the class loaders hosting the respective HADOOP library versions corresponding to the respective data clusters from which data is to be extracted. Thus, the data requests are sent to the respective data clusters by the respective versions of the class loaders using information in the respective library versions, and the requested data may be received by the corresponding library module version and class loader version.

As another example, suppose that an ETL process is configured to relocate data directly from a first data cluster to a second data cluster, each implemented using a different HADOOP library version, and without storing a large amount of data at a third location temporarily. This scenario may occur when data is desired to be extracted from a first data cluster, such as for the purpose of migrating the data to a new system or backing the data up to a different location, but the data clusters are implemented with different HADOOP library versions. In the implementations herein, a single instance of an ETL execution application may execute an ETL process to invoke the corresponding version library modules and class loader versions for the respective libraries, as described, above to essentially stream the data from the first data cluster, through the computing device executing the ETL execution application, and to the second data cluster, reducing the likelihood of data corruption that might be introduced, e.g., because of intermediate data conversion/ storage. For instance, without this capability, system analysts and administrators might need to store a large amount of the data at a temporary third location and/or in an intermediate format and then re-ingest the data to store the data to the destination data cluster.

For discussion purposes, some example implementations are described in the environment of one or more service computing devices in communication with a plurality of different data clusters having HADOOP implementations from different distribution entities for storing data. However, implementations herein are not limited to the particular examples provided, and may be extended to other types of computing system architectures, other types of data storage environments, other data storage cluster types, other distribution entities, other types of data, and so forth, as will be apparent to those of skill in the art in light of the disclosure herein.

Figure 1:
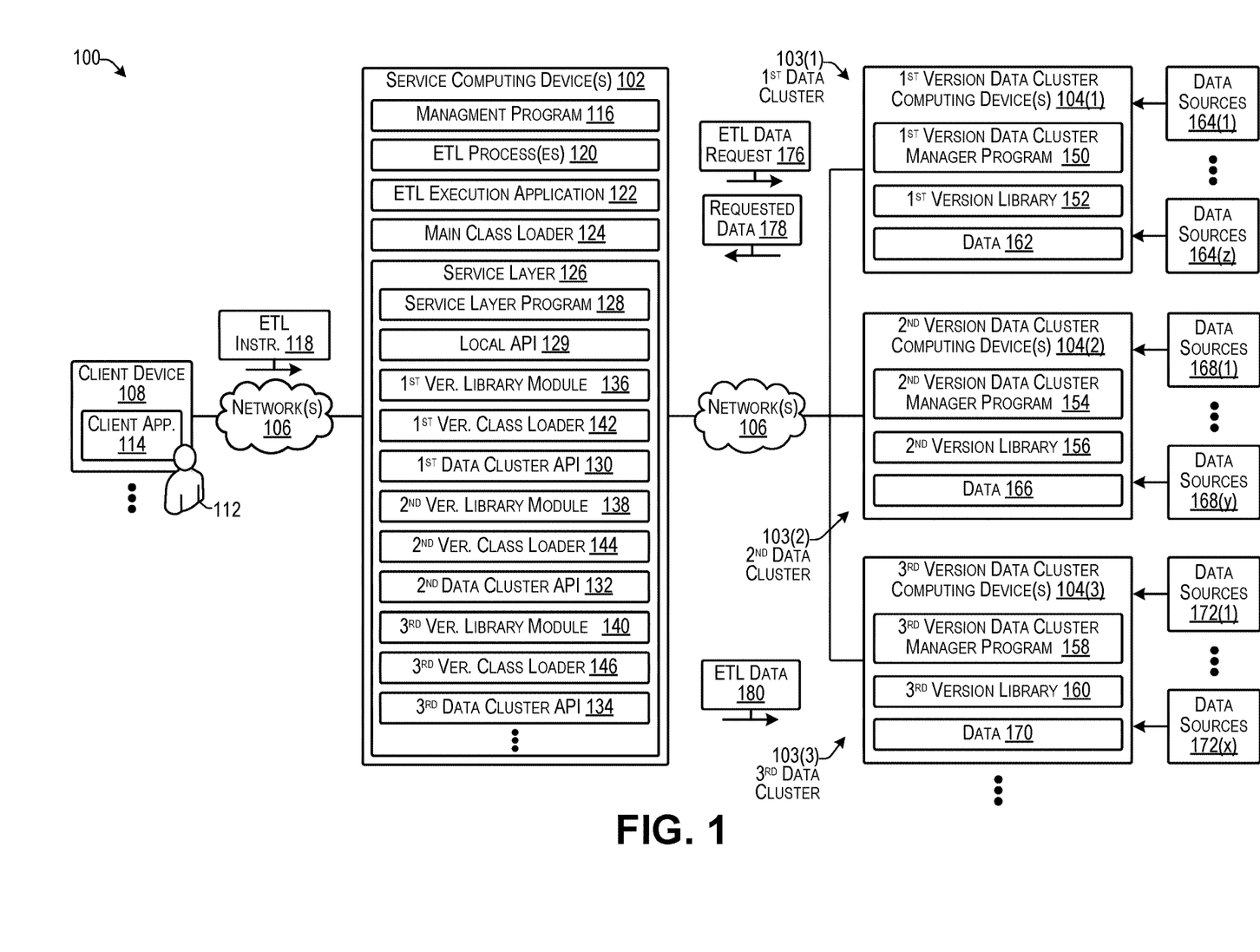
FIG. 1 illustrates an example architecture of a system able to perform ETL operations with a plurality of non-homogenous versions of data clusters according to some examples.

FIG. 1 illustrates an example architecture of a system 100 able to perform ETL operations with a plurality of non-homogenous versions of data clusters according to some examples. The system 100 includes one or more service computing device(s) 102 that are able to communicate with, or otherwise coupled to, a plurality of data clusters 103, each data cluster 103 including a plurality of computing devices 104 coupled to the one or more service computing device(s) 102 through one or more networks 106. Further, the service computing device(s) 102 are able to communicate over the network(s) 106 with one or more client computing devices 108.

In this example, three data clusters 103 are illustrated comprising a first data cluster 103(1), a second data cluster 103(2), and a third data cluster 103(3), although more or fewer data clusters may be included in other examples. Accordingly, implementations herein are not limited to any particular number of the data clusters 103. Further, the plurality of data cluster computing devices 104 may be arranged as first version data cluster computing device(s) 104(1) at the first data cluster 103(1), second version data cluster computing device(s) 104(2) at the second data cluster 103(2), third version data cluster computing device(s) 104(3) at the third data cluster 103(3), and so forth.

In some examples, each different data cluster 103(1)-103(3) may have a different software version installed on its respective computing devices 104(1)-104(3). For example, the respective computing devices 104(1)-104(3) of the respective different clusters 103(1)-103(3) may be configured using a different version of a distribution entity data cluster platform of the HADOOP framework, such as CLOUDERA Distribution for HADOOP, HORTONWORKS Data Platform, MAPR Distribution, and so forth. Thus, as one example, the first version data cluster computing devices 104(1) of the first data cluster 103(1) are configured with a first version of a data cluster platform, such as from a first distribution entity; the second version data cluster computing devices 104(2) of the second data cluster 103(2) may be configured with a second version of a data cluster platform, such as from a second distribution entity that is different from the first distribution entity; and the third version data cluster computing devices 104(3) of the third data cluster 103(3) may be configured with a third version of a data cluster platform from a third distribution entity that is different from the first and second distribution entities. In some examples, some or all of the implementations of the data cluster computing device(s) 104(1)-104(3) may be configured as big data clusters, such as HADOOP big data clusters, that are able to store and analyze huge amounts of unstructured data in a distributed computing environment.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the service computing device(s) 102, the data cluster computing devices 104, and the client device(s) 108 are able to communicate over the one or more networks 106 using wired or wireless connections, and combinations thereof.

In some examples, the service computing device(s) 102 may include one or more servers that may be embodied in any number of ways. For instance, the programs, other functional components, and at least a portion of data storage of the service computing device(s) 102 may be implemented on at least one server, a cluster of servers, a server farm, a data center, a cloud-hosted computing service, and so forth, although other computer architectures may additionally or alternatively be used. Additional configuration details of the service computing device(s) 102 are discussed below with respect to FIG. 8.

Each client device 108 may be any suitable type of computing device, such as a desktop, laptop, tablet computing device, mobile device, smart phone, wearable device, terminal, and/or any other type of computing device able to send data over a network. A user 112 may be associated with a respective client device 108, such as through a respective user account, user login credentials, or the like. Furthermore, the client device(s) 108 may be able to communicate with the service computing device(s) 102 through the one or more networks 106, through separate networks, direct connection, or through any other suitable type of communication connection.

Further, each client device 108 may include a respective instance of a client application 114 that may execute on the client device 108, such as for communicating with a management program 116 or other programs or applications executable on the service computing device(s) 102, as discussed below. In some cases, the client application 114 may include a browser or may operate through a browser, while in other cases, the client application 114 may include any other type of application having communication functionality enabling communication with the management program 116 over the one or more networks 106. As one example, the user 112 may employ the client application 114 to communicate with the management program 116, such as for sending one or more ETL instructions 118 to the management program 116 to configure and/or schedule one or more ETL processes 120 for execution by an execution instance of an ETL execution application 122 on the service computing device(s) 102.

The service computing device(s) 102 may execute the management program 116 and the ETL execution application 122 for executing the one or more ETL processes 120 that may be configured by the user 112. Each ETL process 120 may include one or more ETL operations that are performed during execution of the ETL process 120, such as for extracting data from a specified data cluster 103, transforming data, or loading data to a specified data cluster 103.

The service computing device(s) 102 may further include a main class loader 124 that may be included in or may otherwise be executed by the ETL execution application 122 for loading an ETL process 120, as discussed additionally below. As one example, the main class loader 124 and other class loaders described herein may be JAVA class loaders, although implementations herein are not limited to any particular computer programming language unless explicitly specified.

The service computing device(s) 102 may further include a service layer 126 that may include an executable service layer program 128 that may communicate with the ETL execution application 122 and receive communications from via a local API 129. The service layer may further include other APIs used to communicate with the respective data clusters 103. For instance, each data cluster 103 may have one or more different APIs that are used for communication with the respective version of the data cluster computing devices 104 at that data cluster 103. Accordingly, in this example, the service layer 126 may include a first data cluster API 130, a second data cluster API 132, and a third data cluster API 134 that may be used for communication with the respective data clusters 103(1), 103(2) and 103(3), respectively.

In addition, the service computing device(s) 102 may include respective library module versions for respective libraries of respective ones of the data clusters 103. In this example, the library module versions are illustrated as part of the service layer 126 for convenience of illustration, but this is not required. Accordingly, the service layer 126 may include a first version library module 136, that may be used for interacting with a library of the first data cluster 103(1), a second version library module 138 that may be used for interacting with a library of the second data cluster 103(2), and a third version library module 140 that may be used for interacting with a library of the third data cluster 103(3). In addition, each version of the library module may have an associated version of a class loader that may be included in or otherwise invoked by the respective version of the library module. Thus, the service computing device(s) 102 includes a first version class loader 142 associated with the first version library module 136, a second version class loader 144 associated with the second version library module 138, and a third version class loader 146 associated with the third version library module 140.

In some examples, the service layer program 128 may receive an ETL request from the main class loader 124 and may route the ETL request to the correct version library module, e.g., based on determining the target data cluster 103. The version library module may invoke its version class loader to access the library version for the targeted data cluster 103 and to send the ETL request to the targeted data cluster 103.

The data cluster computing devices 104 may include, for each data cluster 103, a respective data cluster manager program that is executable on at least one data cluster computing device 104 at each data cluster 103. Further, the data cluster computing devices 104 of each data cluster 103 may include a respective library that is utilized by the service computing device(s) 102 for interacting with that respective data cluster. The respective version of the data cluster manager program and version of the library may correspond to the version of the data cluster platform installed at the respective data cluster 103. Accordingly, the respective data cluster manager programs and libraries at the respective data clusters 103 may differ substantially from each other in some cases.

In this example, a first version data cluster manager program 150 and first version library 152 are installed at the first version data cluster computing devices 104(1) of the first data cluster 103(1); a second version data cluster manager program 154 and second version library 156 are installed at the second version data cluster computing devices 104(2) of the second data cluster 103(2); and a third version data cluster manager program 158 and third version library 160 are installed at the third version data cluster computing devices 104(3) of the third data cluster 103(3).

In some cases, the versions of the libraries 152, 156, and 160 of the respective data clusters 103(1), 103(2), and 103(3) may be downloaded from the respective data clusters 103(1), 103(2), and 103(3), and stored at the service computing device(s) 102, or may be otherwise accessed before or during execution of an ETL process 120. As one example, copies of the libraries 152, 156, and 160 may be maintained at the service computing device(s) 102 in association with the respective version class loaders 142, 144 and 146, respectively. In some cases, the versions of the libraries 152, 156, and 160 may include, or may be configured to be used with, the data cluster APIs 130, 132, and 134, respectively. In addition, the libraries 152, 156, and 160 may include various other types of library objects, such as pre-compiled executable code and subroutines, collections of functions, classes, values and/or type specifications that may be used for interacting with the data clusters 103(1), 103(2) and 103(3), respectively, and the respective associated data.

In addition, one, some, or all of the data clusters 103 may receive data from various data sources and may store the received data at the respective data cluster 103. In this example, the first data cluster 103(1) may receive data 162 from data sources 164(1)-164(z); the second data cluster 103(2) may receive data 166 from data sources 168(1)-168(y); and the third data cluster 103(3) may receive data 170 from data sources 172(1)-172(x). Furthermore, as discussed below, in some cases the data 162, 166, 170 stored at the respective data clusters 103(1), 103(2), 103(3) may be received from the service computing device(s) 102 and/or other ones of the data clusters 103, such as through ETL processing, rather than, or in addition to, being received from the data sources 164, 168, 172.

As one example, suppose that the user 112 has sent the ETL instruction 118 to instruct the management program 116 to execute the ETL execution application 122 to perform an ETL process 120 to extract data from the first data cluster 103(1) and store the results in the third data cluster 103(3). In this example, the ETL execution application 122 may use the service layer 126 including the service layer program 128 and local API 129 to pass an ETL data request 176 to the first version class loader 142, which may host the first version library 152 corresponding to the first data cluster 103(1). The first version class loader 142 may employ the first data cluster API 130 and the first version library 152 to send the ETL data request 176 in proper format to the first version data cluster computing devices 104(1) at the first cluster 103(1). The ETL data request 176 may cause at least one of the first version data cluster computing devices 104(1) at the first cluster 103(1) to send the requested data 178 to the service computing device(s) 102, such as to the first version class loader 142, which may forward the requested data to the ETL execution application 122, such as via the service layer program 128 and the local API 129.

In addition, the ETL execution application 122 may send, via the local API 129, an ETL request to the service layer program 128 for sending the data 178 received from the first data cluster 103(1) to the third data cluster 103(3). For example, the service layer program 128 may route the request to the third version library module 140, which may invoke the third version class loader 146, which may host the third version library 160. The third version class loader may use information from the third version library 160 and the third data cluster API 134 to send the ETL data 180 to the third data cluster 103(3). One or more of the third version data cluster computing devices 104(3) may receive and store the received ETL data 180.

Figure 2:
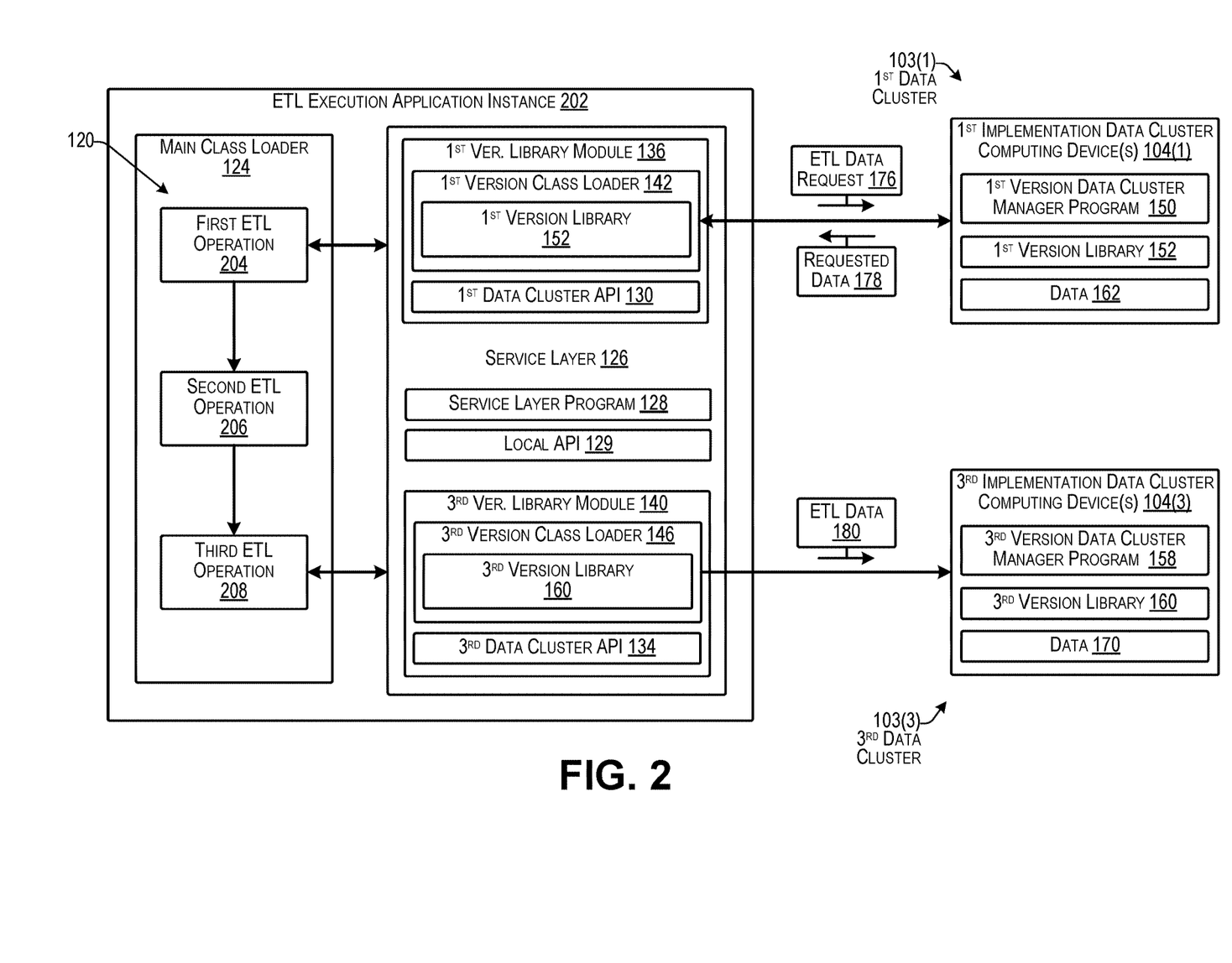
FIG. 2 is a block diagram illustrating an example of an ETL execution application instance executing an ETL process according to some implementations.

FIG. 2 is a block diagram illustrating an example of an ETL execution application instance 202 executing an ETL process 120 according to some implementations. In this example, similar to the example discussed above with respect to FIG. 1, suppose that the user 112 has sent the ETL instruction 118 to instruct the management program 116 to execute the ETL execution application 122. The ETL execution application 122 may execute as a single ETL execution application instance 202 illustrated in FIG. 2 to perform a specified ETL process 120. Further, in this example, suppose that the ETL process 120 includes three ETL operations, namely, a first ETL operation 204 to extract data from the first data cluster 103(1), a second ETL operation 206 to transform the extracted data in a specified manner, and a third ETL operation 208 to store the transformed data at the third data cluster 103(3).

When the ETL execution application instance 202 begins execution, it may call the main class loader 124 to execute the first operation 204 of the ETL process 120 to send an ETL data request to the service layer program 128, such as via the local API 120. In addition, based on determining that the first data cluster 103(1) is the target of the request, the service layer program 128 may invoke execution of the first version library module 136, which may in turn call the first version class loader 142, which is able to access and use the library objects in the first version library 152 corresponding to the first data cluster 103(1). As one example, the first version library 152 may be a HADOOP library corresponding to a version of a HADOOP data cluster platform implemented on the first cluster 103(1).

The first version class loader 142 may employ the first data cluster API 130 and information from the first version library 152 to send the ETL data request 176 in proper form to the first version data cluster computing devices 104(1) at the first cluster 103(1). The ETL data request 176 may cause at least one of the first version data cluster computing devices 104(1) at the first cluster 103(1) to send the requested data 178 to the ETL execution application instance 202 at the service computing device(s) 102, such as via the first data cluster API 130 to the first version class loader 142, which may send the requested data to the ETL execution application instance 202 via the service layer program 128.

The main class loader 124 may execute the second ETL operation 206, such as to transform the requested data in some manner, e.g., to normalize the data, to correlate the data with other data, to filter the data, or any of numerous other data operations, as will be apparent to those of skill in the art having the benefit of the disclosure herein. Furthermore, the main class loader 124 may execute the third ETL operation 208 for sending the transformed data as ETL data 180 to the third data cluster 103(3). For example, the main class loader 124 may send an ETL request to the service layer program 128 via the local API 129. Based at least in part on determining that the target of the ETL request is the third data cluster 103(3), the service layer program 128 may invoke execution of the third version library module 140, which may call the third version class loader 146. The third version class loader 146 may employ the third data cluster API 134 and information from the third version library 160, which may be hosted by the third version class loader 146, to send the ETL data 180 to the third data cluster 103(3). One or more of the third version data cluster computing devices 104(3) may receive and store the ETL data 180.

Figure 3:
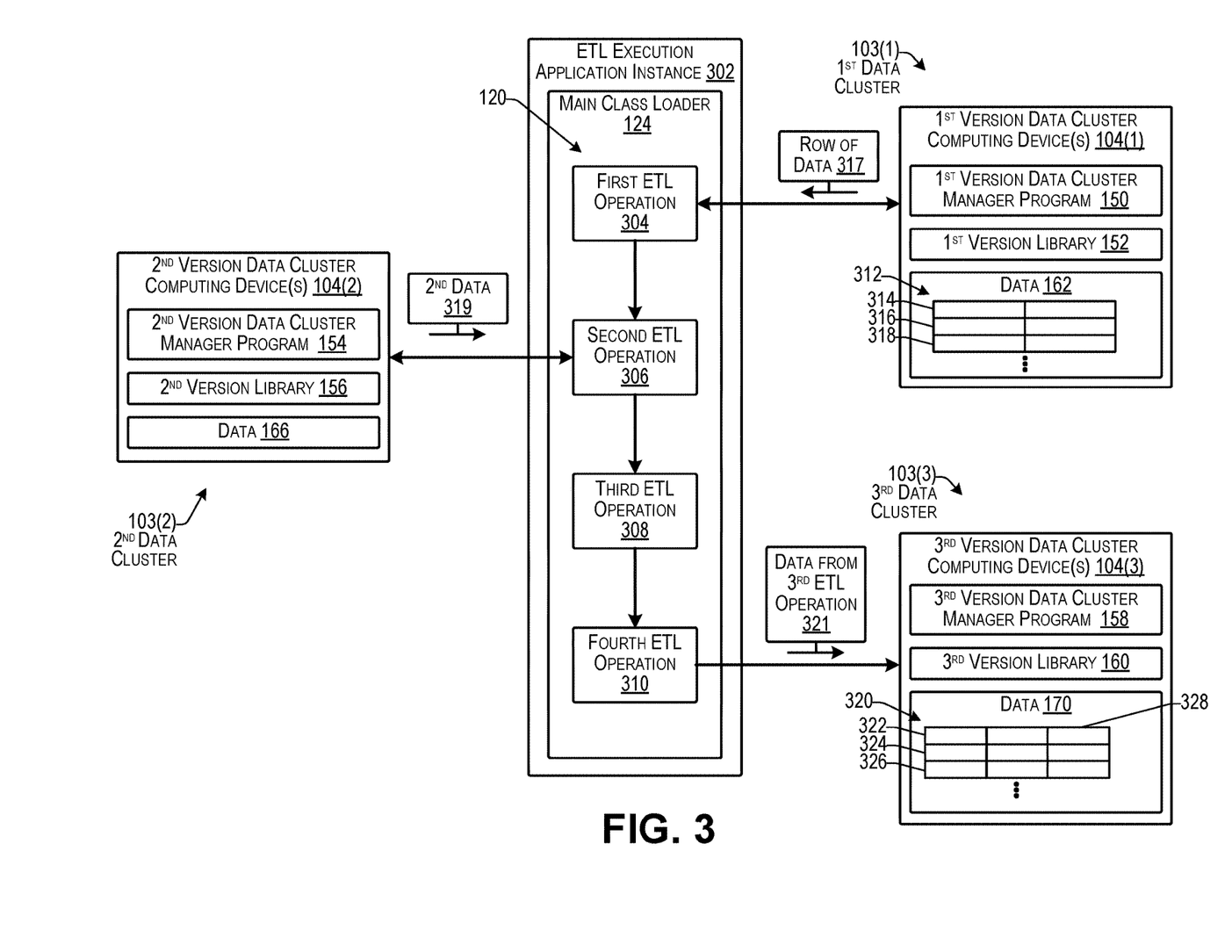
FIG. 3 is a block diagram illustrating an example of execution of an ETL process according to some implementations.

FIG. 3 is a block diagram illustrating an example of execution of an ETL process according to some implementations. For example, as discussed above, an ETL execution application instance 302 may call the main class loader 124 to execute an ETL process 120 that includes a first ETL operation 304, a second ETL operation 306, a third ETL operation 308, and a fourth ETL operation 310. Furthermore, in this example, suppose that the data 162 maintained by the first data cluster 103(1) includes data maintained in a data structure 312 that includes a plurality of rows 314, 316, 318, . . . , such as rows in a table, a database, or any other suitable type of data structure 312. Additionally, suppose that the first ETL operation 304 is configured to obtain the data from the data structure 312 on a row-by-row basis, e.g., as a row of data 317, one row at a time, and pass the received row of data to the second ETL operation 306.

Further, in this example, the second ETL operation 306 may be configured to receive the row of data 317 from the first ETL operation 304 and obtain second data 319 from the second data cluster 103(2) that is to be combined with or otherwise correlated with the row of data 317 obtained by the first ETL operation 304. In addition, the third ETL operation 308 may be configured to receive the row of data 317 and the second data 319, and may, for example, normalized or otherwise transformed the data 317 and/or 319 make such that the second data 319 is compatible with the data in the row of data 317 received from the first data cluster 103(1), and vice versa.

Next, the fourth ETL operation 310 may be configured to specify that the data 321 from the third ETL operation 308, including the row of data 317 and the second data 319, which may have been transformed at 308, is sent to the third data cluster 103(3) for inclusion together in a data structure 320, which may include a plurality of rows 322, 324, 326, . . . , and which may include at least one column 328 for inclusion of the data from the second data cluster 103(2). Thus, the data structure 320 may be populated row-by-row by receipt of each row of data 317 and second data 319.

The techniques discussed above with respect to FIGS. 1 and 2 may be utilized for executing the ETL process 120 of FIG. 3 using the single application instance 302 to perform all of the ETL operations 304-310. For example, as discussed above, the main class loader 124 may send the ETL operations 304, 306, and 310 to the service layer program 128, which in turn may invoke execution of respective versions of the library module 136, 138 and 140 for sending appropriate ETL communications to the first data cluster 103(1), the second data cluster 103(2), and the third dated cluster 103(3), respectively.

Figure 4:
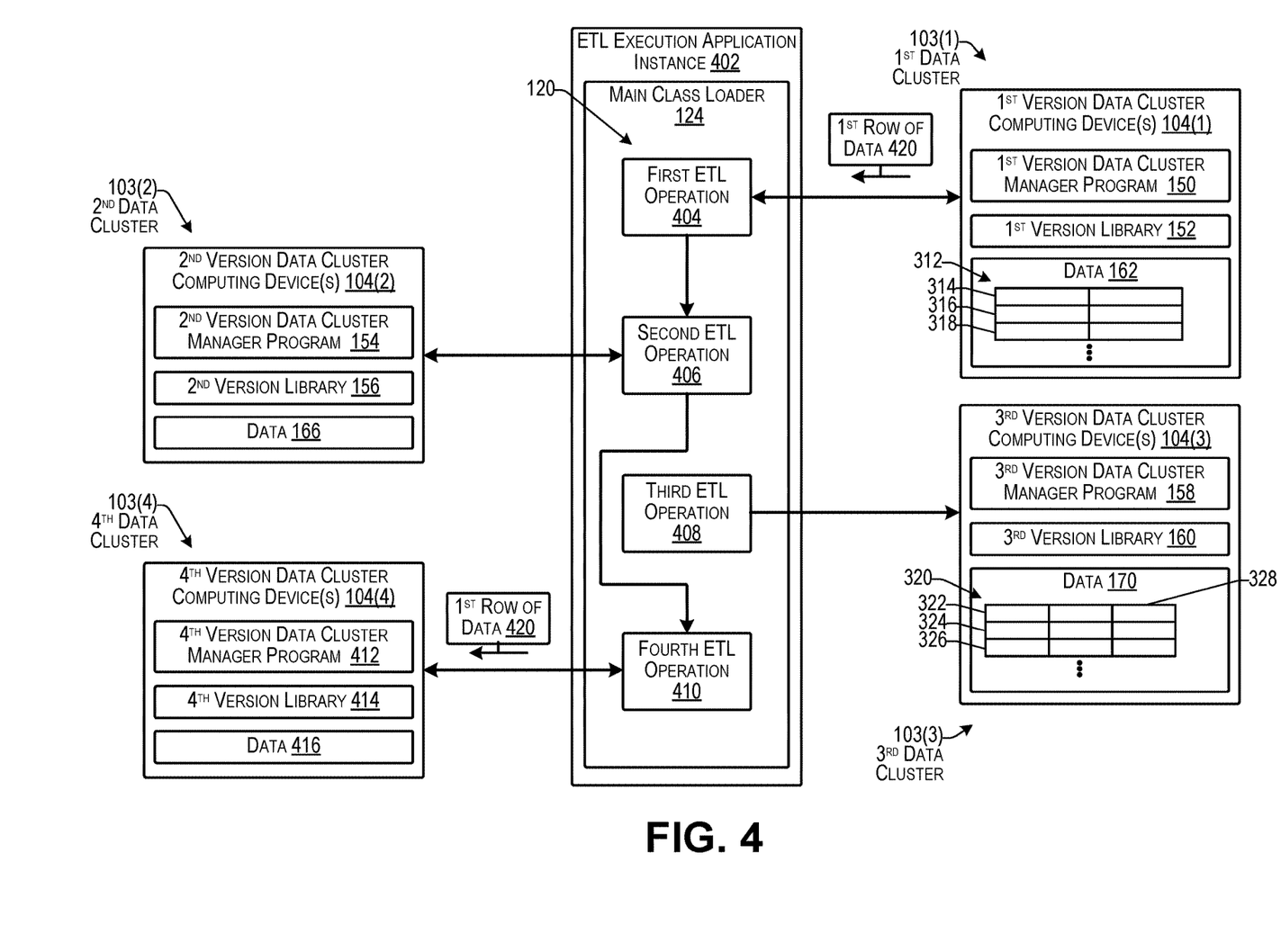
FIG. 4 is a block diagram illustrating an example of execution of an ETL process according to some implementations.

FIG. 4 is a block diagram illustrating an example of execution of an ETL process according to some implementations. For example, an ETL execution application instance 402 may call the main class loader 124 to execute an ETL process 120 that includes a first ETL operation 404, a second ETL operation 406, a third ETL operation 408, and a fourth ETL operation 410. Furthermore, in this example, similar to the example of FIG. 3 discussed above, suppose that the data 162 maintained by the first data cluster 103(1) includes data maintained in the data structure 312 that includes the plurality of rows 314, 316, 318, . . . , such as rows in a table, a database, or any other suitable type of data structure 312. The example of FIG. 4 includes a fourth data cluster 103(4) including one or more fourth version data cluster computing devices 104(4), having a fourth version data cluster manager program 412, a fourth version library 414, and data 416.

In some cases, the ETL operations to be performed by the ETL execution application instance 402 when performing the entire ETL process 120 may be determined on a row-by-row basis as each data row is processed. For instance, within the same ETL process 122, two different rows of data might travel different paths (i.e., be subject to different ETL operations) within the ETL process 120 and, by doing so, cause the ETL process 120 to access different data clusters for the different respective rows of data.

In this example, suppose that the first ETL operation 404, similar to operation 304 discussed above with respect to FIG. 3, is configured to read the data from the data structure 312 on a row-by-row basis, e.g., one row at a time, and pass the received row of data to the second ETL operation 406. Accordingly, the main class loader 124 may execute the first ETL operation 404 to receive the first row of data 420. Further, in this example, the second ETL operation 406 may be configured to check the data 166 stored at the second data cluster 103 to determine if there is data for correlation with the row of data currently being processed. If so, the second ETL operation 406 may be configured to pass the row of data and the correlated second data obtained from the second data cluster to the third ETL operation 408. On the other hand, if there is not data at the second data cluster 103(2) for correlation with the row of data currently being processed, the second ETL operation 406 may be configured to skip the third ETL operation 408 and instead pass the data from the row currently being processed to the fourth ETL operation 410.

In this example, the first row of data 420 is being processed and suppose that there is no second data at the second data cluster 103(2) for correlation with the first row of data 420. Accordingly, the first row of data 420 may be passed to the fourth ETL operation 410 and the third ETL operation 408 is not performed. At the fourth ETL operation 410, the first row of data 420 is sent to the fourth data cluster 103(4) for storage by the fourth data cluster 103(4).

The techniques discussed above with respect to FIGS. 1 and 2 may be utilized for executing the ETL process 120 of FIG. 4 using the single application instance 402 to perform the ETL operations 404-410, which performance is dependent in part on the data content being processed. As discussed above, the main class loader 124 may send the ETL operations 404, 406, 408 and 410, when performed, to the service layer program 128, which in turn may invoke execution of respective versions of the library modules 136, 138, 140 and a library module configured for the fourth version library 414 (not shown in FIG. 4) for sending appropriate ETL communications to the first data cluster 103(1), the second data cluster 103(2), the third dated cluster 103(3), and the fourth data cluster 103(4), respectively. Additionally, this example allows for the use of multiple data cluster versions during the execution of a single multistep ETL process 120 by a single ETL execution application instance 402, eliminating the need for splitting ETL execution or implementing complex distributed computing systems.

Figure 5:
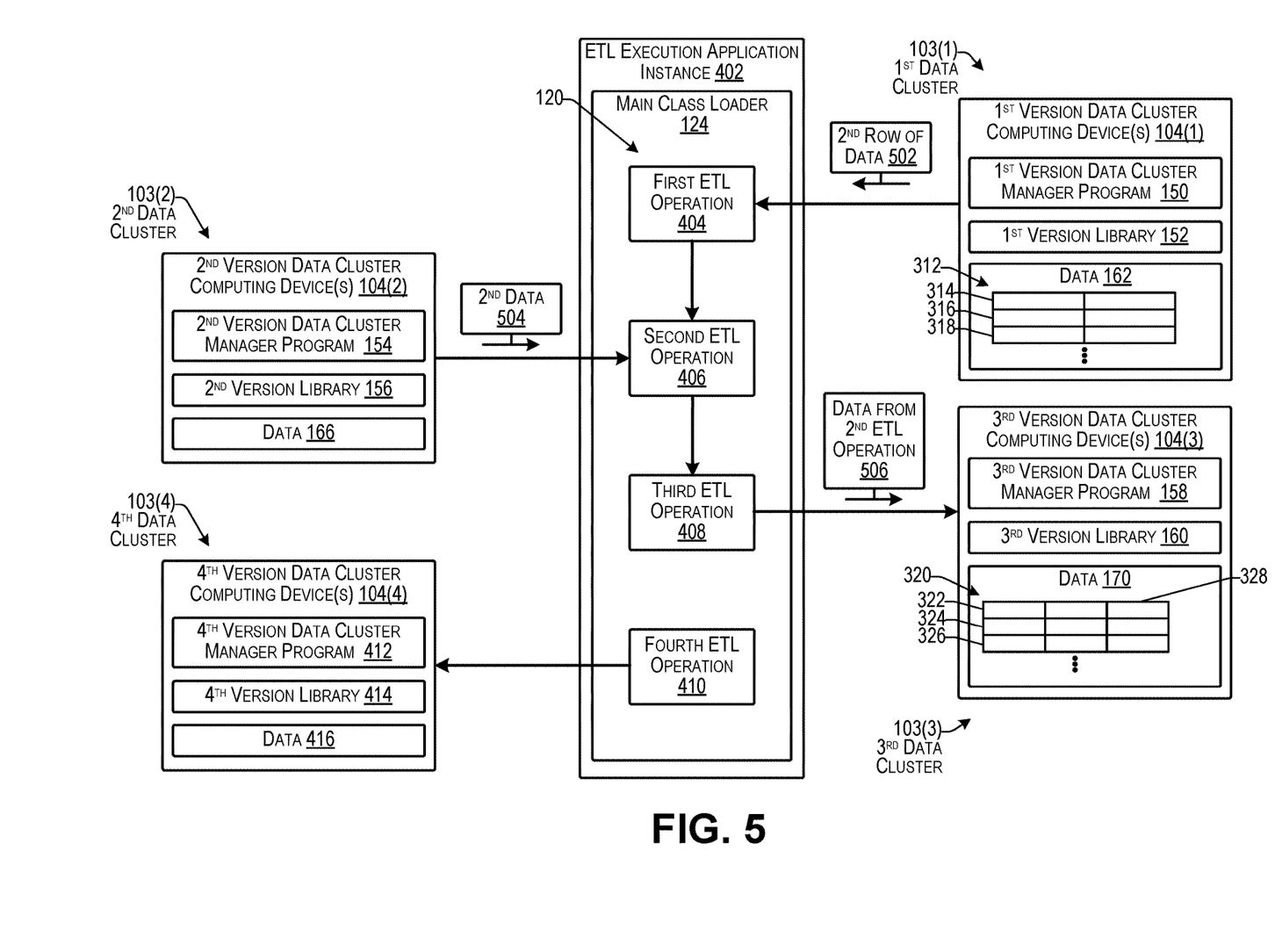
FIG. 5 is a block diagram illustrating an example of execution of an ETL process according to some implementations.

FIG. 5 is a block diagram illustrating an example of execution of an ETL process according to some implementations. FIG. 5 illustrates a continuation of the example of FIG. 4 discussed above for execution of the ETL execution application instance 402. In the example of FIG. 5, the second row of data 502 is obtained from the data structure 312 at the first data cluster 103(1) by execution of the first ETL operation 404. During execution of the second ETL operation 406, second data 504 is correlated with the second row of data 502 and is received from the second data cluster 103(2). Since the second ETL operation 406 identified second data 504 to correlate with the second row of data 502, the data is passed from the second ETL operation 406 to the third ETL operation 408, rather than to the fourth ETL operation 410.

The third ETL operation 408 is executed to send the data 506 from the second ETL operation to the third data cluster 103(3) for inclusion in the data structure 320 at the third data cluster 103(3). Accordingly, the ETL process 120 may be executed continually with the third data cluster 103(3) or the fourth data cluster 103(4) receiving data from the ETL process 120, depending on whether a row of data being processed is able to be correlated with data from the second data cluster 103.

Figure 6:
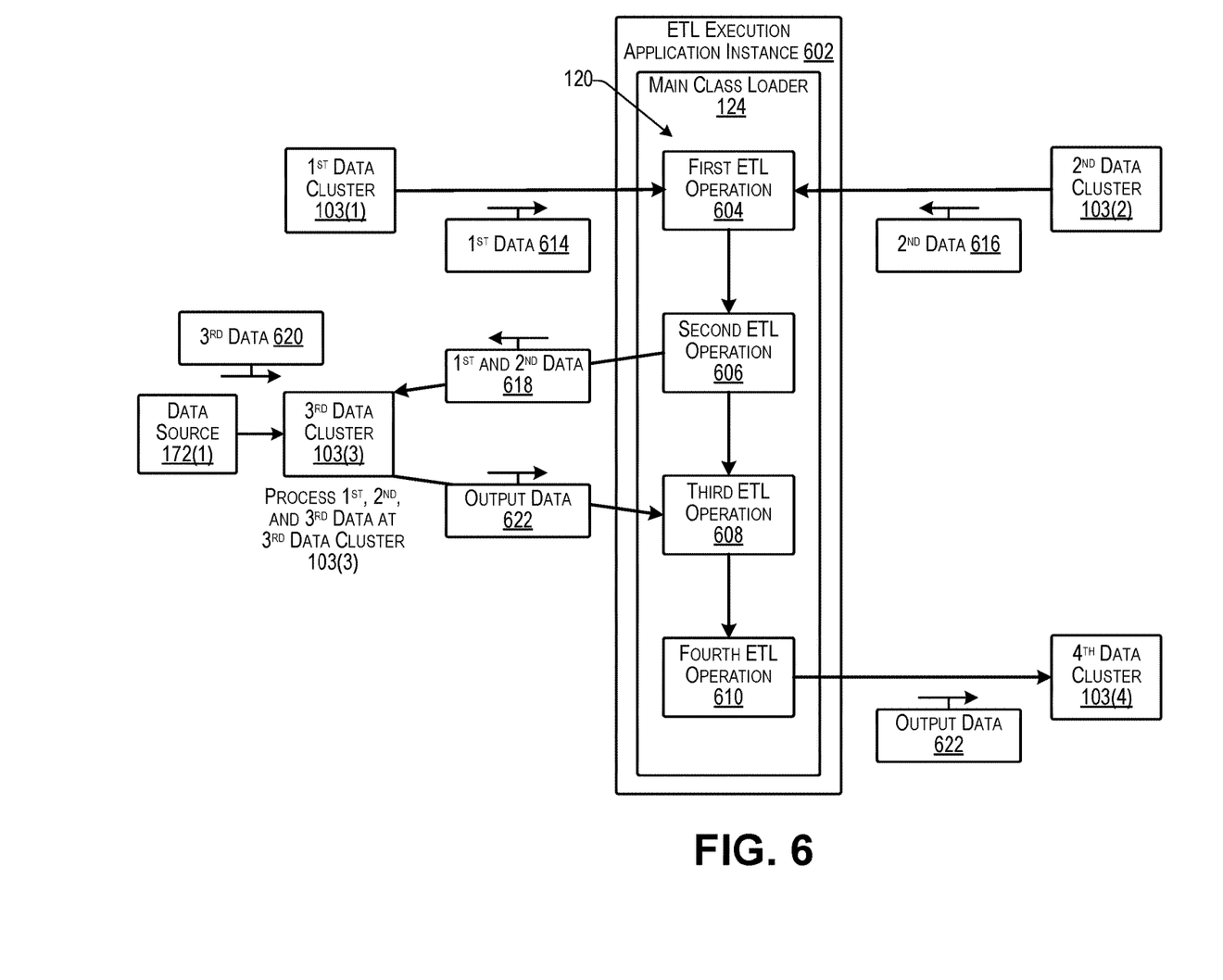
FIG. 6 is a block diagram illustrating an example of execution of an ETL process according to some implementations.

FIG. 6 is a block diagram illustrating an example of execution of an ETL process according to some implementations. For example, as discussed above, an ETL execution application instance 602 may call the main class loader 124 to execute an ETL process 120 that includes a first ETL operation 604, a second ETL operation 606, a third ETL operation 608, and a fourth ETL operation 610. The example of FIG. 6 illustrates that implementations herein are able to receive data concurrently from multiple data clusters by execution of a single ETL operation and further that data processing may be offloaded by an ETL operation to one of the data clusters and the result later retrieved by another ETL operation.

The first ETL operation 604 is configured to concurrently receive first data 614 from the first data cluster 103(1) and second data 616 from the second data cluster 103(2) by execution of the single first ETL operation 604. For instance, due to the configuration of the implementations disclosed herein, including the plurality of independently executable library modules, any number of data clusters 103 may be accessed concurrently by a single ETL operation for sending or receiving data from the respective data clusters 103.

The second ETL operation 606 may be executed to receive the first data 614 and the second data 616 from the first ETL operation 604, and to send the first and second data 618 to the third data cluster 103(3). In addition, in this example, suppose that the third data cluster 103(3) also receives third data 620 from the data source 172(1). Furthermore, suppose that the second ETL operation 606 instructs the third data cluster 103(3) to process the first data, the second data, and the third data at the third data cluster 103(3). The processing performed by the third data cluster 103(3) may be any type of data processing from simple to extremely complex data processing.

The third ETL operation 608 may be executed to obtain the output data 622 that is the result of the data processing performed by the third data cluster 103(3). Furthermore, the fourth ETL operation 610 may be executed to receive the output data 622 from the third ETL operation 608 and to send the output data 622 to the fourth data cluster 103(4).

Figure 7:
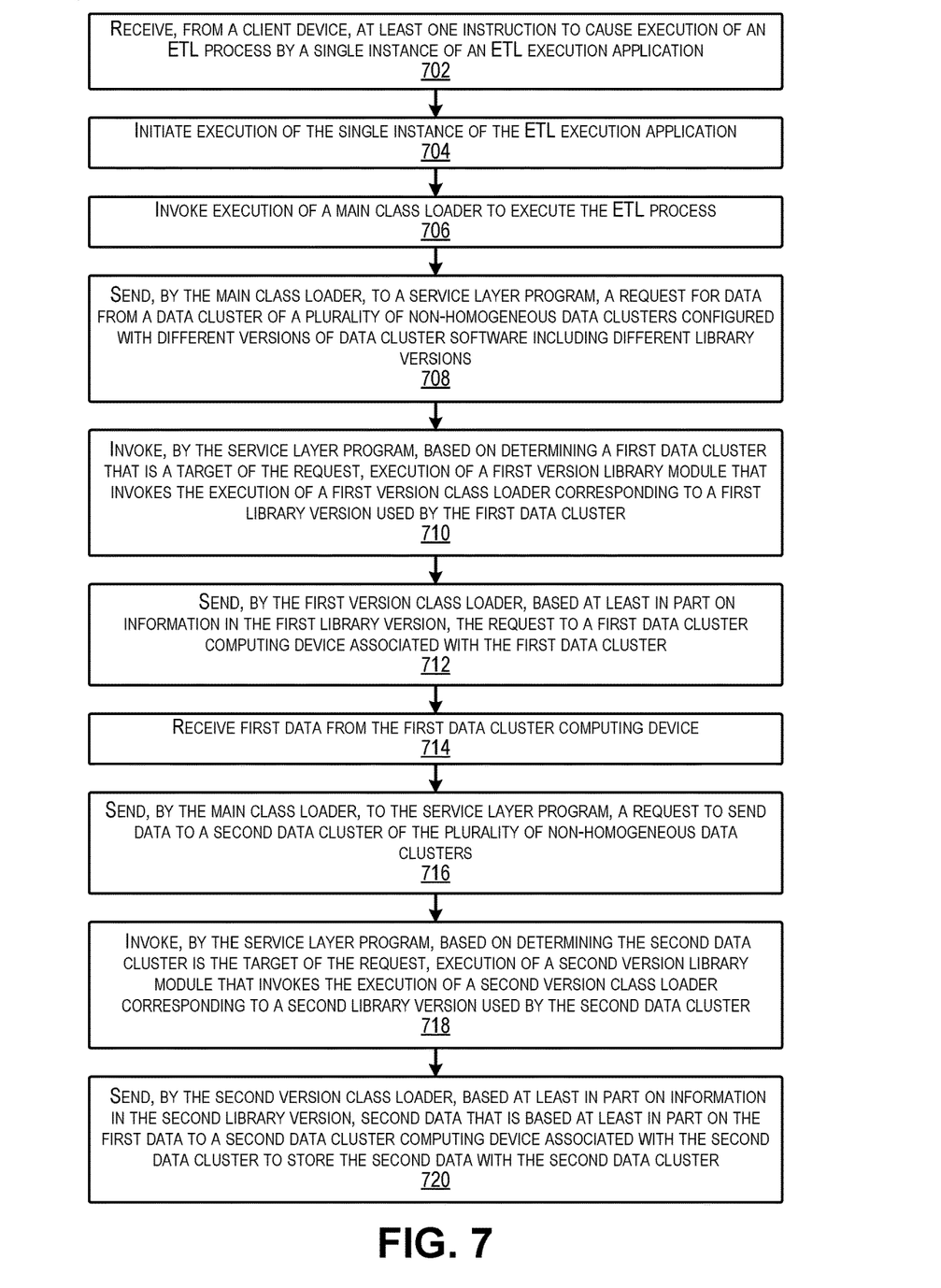
FIG. 7 is a flow diagram illustrating an example process for performing ETL processing with non-homogeneous data clusters according to some implementations.

FIG. 7 is a flow diagram illustrating an example process 700 for performing ETL processing with non-homogeneous data clusters according to some implementations. The process is illustrated as a collection of blocks in a logical flow diagram, which represents a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the process is described with reference to the environments, frameworks, and systems described in the examples herein, although the process may be implemented in a wide variety of other environments, frameworks, and systems. In the example of FIG. 7, the process 700 may be executed at least in part by the one or more service computing device(s) 102 executing the ELT executing application 122, or the like.

At 702, the computing device may receive, from a client device, at least one instruction to cause execution of an ETL process by a single instance of an ETL execution application.

At 704, the computing device may initiate execution of the single instance of the ETL execution application.

At 706, the computing device may invoke execution of a main class loader to execute the ETL process.

At 708, the computing device may send, e.g., by execution of the main class loader, to a service layer program, a request for data from a data cluster of a plurality of non-homogeneous data clusters configured with different versions of data cluster software including different library versions.

At 710, the computing device may invoke, e.g., by execution of the service layer program, based on determining a first data cluster that is a target of the request, execution of a first version library module that invokes the execution of a first version class loader corresponding to a first library version used by the first data cluster.

At 712, the computing device may send, e.g., by execution of the first version class loader, based at least in part on information in the first library version, the request to a first data cluster computing device associated with the first data cluster.

At 714, the computing device may receive first data from the first data cluster computing device.

At 716, the computing device may send, e.g., by execution of the main class loader, to the service layer program, a request to send data to a second data cluster of the plurality of non-homogeneous data clusters.

At 718, the computing device may invoke, e.g., by execution of the service layer program, based on determining the second data cluster is the target of the request, execution of a second version library module that invokes the execution of a second version class loader corresponding to a second library version used by the second data cluster.

At 720, the computing device may send, e.g., by execution of the second version class loader, based at least in part on information in the second library version, second data that is based at least in part on the first data to a second data cluster computing device associated with the second data cluster to store the second data with the second data cluster. For example, the first data may have been transformed at least in part to make up at least a portion of the second data.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
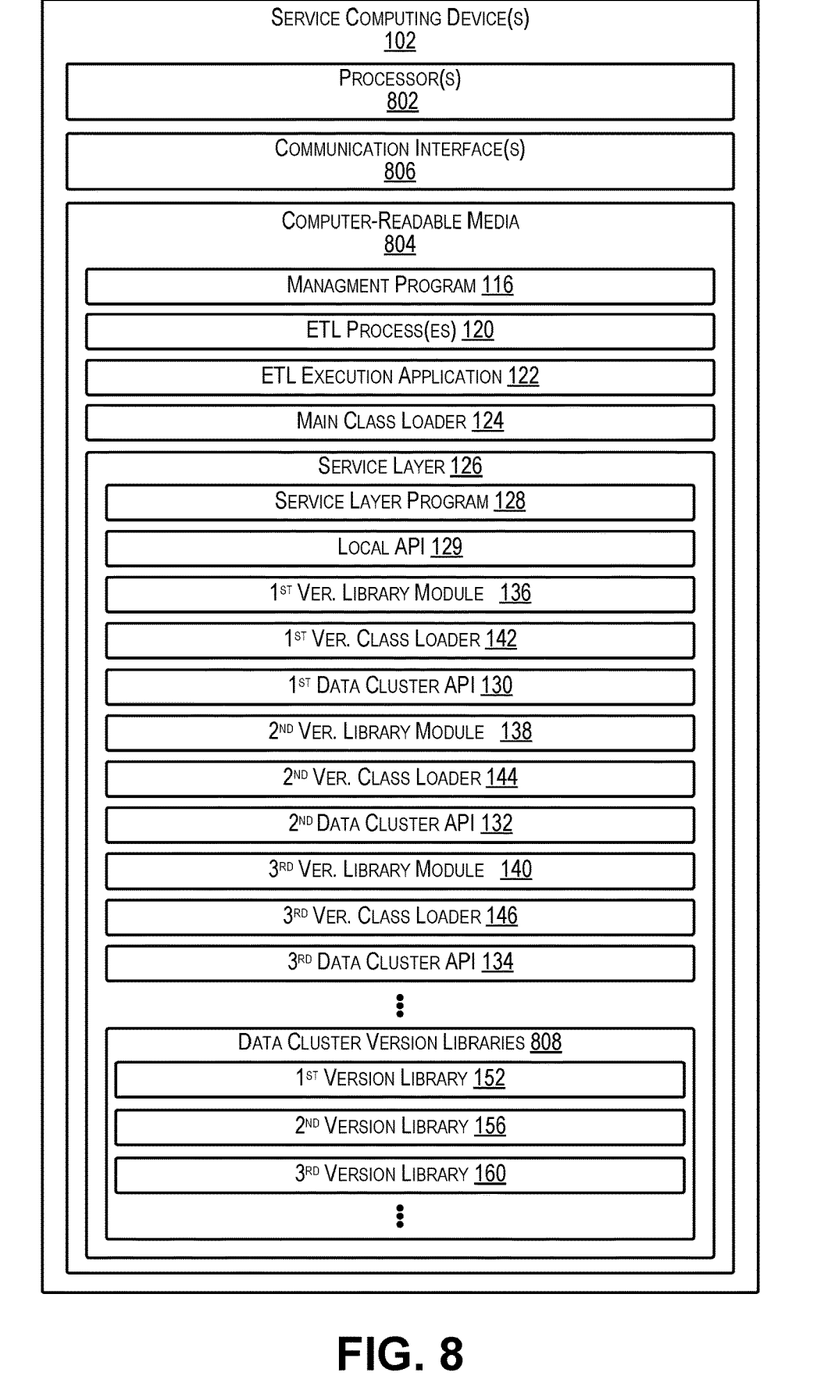
FIG. 8 illustrates select example components of the service computing device(s) that may be used to implement at least some of the functionality of the systems described herein.

FIG. 8 illustrates select example components of the service computing device(s) 102 that may be used to implement at least some of the functionality of the systems described herein. The service computing device(s) 102 may include one or more servers or other types of computing devices that may be embodied in any number of ways. For instance, in the case of a server, the programs, other functional components, and data may be implemented on a single server, multiple servers, a cluster of servers, a server farm or data center, a cloud-hosted computing service, and so forth, although other computer architectures may additionally or alternatively be used. Multiple service computing device(s) 102 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, the service computing device(s) 102 includes, or may have associated therewith, one or more processors 802, one or more computer-readable media 804, and one or more communication interfaces 806. Each processor 802 may be a single processing unit or a number of processing units, and may include single or multiple computing units, or multiple processing cores. The processor(s) 802 can be implemented as one or more central processing units, microprocessors, microcomputers, microcontrollers, digital signal processors, state machines, logic circuitries, and/or any devices that manipulate signals based on operational instructions. As one example, the processor(s) 802 may include one or more hardware processors and/or logic circuits of any suitable type specifically programmed or configured to execute the algorithms and processes described herein. The processor(s) 802 may be configured to fetch and execute computer-readable instructions stored in the computer-readable media 804, which may program the processor(s) 802 to perform the functions described herein.

The computer-readable media 804 may include volatile and nonvolatile memory and/or removable and non-removable media implemented in any type of technology for storage of information, such as computer-readable instructions, data structures, program modules, or other data. For example, the computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 102, the computer-readable media 804 may be a tangible non-transitory medium to the extent that, when mentioned, non-transitory computer-readable media exclude media such as energy, carrier signals, electromagnetic waves, and/or signals per se. In some cases, the computer-readable media 804 may be at the same location as the service computing device 102, while in other examples, the computer-readable media 804 may be partially remote from the service computing device 102.

The computer-readable media 804 may be used to store any number of functional components that are executable by the processor(s) 802. In many implementations, these functional components comprise instructions or programs that are executable by the processor(s) 802 and that, when executed, specifically program the processor(s) 802 to perform the actions attributed herein to the service computing device(s) 102. Functional components stored in the computer-readable media 804 may include the management program 116, the ETL execution application, the main class loader 124, the service layer program 128, the first, second and third version library modules 136, 138, and 140, respectively, and the first, second and third version class loaders 142, 144, and 146, respectively, each of which may include one or more computer programs, applications, executable code, or portions thereof. Further, while these programs are illustrated together in this example, during use, some or all of these programs may be executed on separate service computing device(s) 102.

In addition, the computer-readable media 804 may store data, data structures, and other information used for performing the functions and services described herein. For example, the computer-readable media 804 may store the ETL process(es) 120, the local API 129, the first data cluster API 130, the second data cluster API 132, and the third data cluster API 134. In addition, in some examples, the computer readable media 804 may store copies of each of the data cluster version libraries 808, such as the first version library 152, the second version library 156, and the third version library 160. Further, while these data and data structures are illustrated together in this example, during use, some or all of these data and/or data structures may be stored on separate service computing device(s) 102. The service computing device 102 may also include or maintain other functional components and data, which may include programs, drivers, etc., and the data used or generated by the functional components. Further, the service computing device 102 may include many other logical, programmatic, and physical components, of which those described above are merely examples that are related to the discussion herein.

The one or more communication interfaces 806 may include one or more software and hardware components for enabling communication with various other devices, such as over the one or more network(s) 106. For example, the communication interface(s) 806 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

In some examples herein, the data cluster computing devices 104 may have similar hardware configurations to those discussed above for the service computing device(s)

102, but with different functional components and data, such as indicated in FIG. 1. Further, the data cluster computing devices 104 may include many other logical, programmatic, and physical components, of which those described above are merely examples that are related to the discussion herein.

Various instructions, methods, and techniques described herein may be considered in the general context of computer-executable instructions, such as computer programs and applications stored on computer-readable media and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
a first computing device configured to communicate over a network with a plurality of data cluster computing devices associated with a plurality of data clusters, wherein a first data cluster of the plurality of data clusters is configured with a first version of data cluster software including a first library version, and wherein a second data cluster of the plurality of data clusters is configured with a second version of data cluster software including a second library version that is different from the first library version, the first computing device executing a single instance of an application to perform operations comprising:
sending, based at least in part on information in the first library version, to a first data cluster computing device associated with the first data cluster, a request for first data;
receiving the first data from the first data cluster computing device; and
sending, based at least in part on information in the second library version, second data that is based at least in part on the first data to a second data cluster computing device associated with the second data cluster to store the second data with the second data cluster.

2. The system as recited in claim 1, wherein a third data cluster of the plurality of data clusters is configured with a third version of data cluster software including a third library version that is different from the first library version and the second library version, the operations further comprising:
receiving as the first data, a row of data from a data structure stored by the first data cluster;
sending, based at least in part on information in the third library version, to a third data cluster computing device associated with the third data cluster, a request for third data corresponding to the row of data;
receiving the third data from the third data cluster computing device; and
including the third data with the second data sent to the second data cluster computing device.

3. The system as recited in claim 2, wherein the second data cluster computing device stores the second data and the third data in a same row of a data structure at the second data cluster.

4. The system as recited in claim 2, wherein a fourth data cluster of the plurality of data clusters is configured with a fourth version of data cluster software including a fourth library version that is different from at least one of the first library version, the second library version or the third library version, the operations further comprising:
receiving another row of data from the data structure stored by the first data cluster;
determining that third data is not available for the other row of data; and
based at least on determining that third data is not available for the other row, sending, based at least in part on information in the fourth library version, fourth data that is based on the other row of data to a fourth data cluster computing device associated with the fourth data cluster to store the fourth data with the fourth data cluster instead of the second data cluster.

5. The system as recited in claim 1, wherein a third data cluster of the plurality of data clusters is configured with a third version of data cluster software including a third library version that is different from at least one of the first library version or the second library version, the operations further comprising:
sending, based at least in part on information in the third library version, to a third data cluster computing device associated with the third data cluster, the first data and a request to perform processing on the first data;
receiving, based at least in part on information in the third library version, an output of the processing from the third data cluster computing device; and
including the output of the processing as at least a portion of the second data sent to the second data cluster computing device.

6. The system as recited in claim 1, wherein a third data cluster of the plurality of data clusters is configured with a third version of data cluster software including a third library version that is different from at least the first library version, the operations further comprising:
sending, based at least in part on information in the third library version, a request to a third data cluster computing device associated with the third data cluster, a request for third data, wherein the request for third data is sent concurrently with the request for the first data.

7. The system as recited in claim 1, wherein the operation of sending, based at least in part on information in the first library version, the request to the first data cluster computing device further comprises an operation of:
invoking execution of a first version class loader on the first computing device, the first version class loader configured to determine one or more library objects in the first library version to use for sending the request to the first data cluster computing device.

8. The system as recited in claim 7, wherein the operation of sending, based at least in part on information in the second library version, the second data to the second data cluster computing device further comprises an operation of:

invoking execution of a second version class loader on the first computing device, the second version class loader configured to determine one or more library objects in the second library version to use for sending the second data to the second data cluster computing device.

9. The system as recited in claim 7, the operations further comprising
invoking execution of a main class loader on the first computing device; and
sending, by the main class loader, via a first API, a first request to a service layer program executing on the first computing device, the service layer program invoking execution of a first version library module that invokes the execution of the first version class loader.

10. The system as recited in claim 7, wherein the operation of sending, based at least in part on information in the first library version, the request to the first data cluster computing device further comprises an operation of:
sending, by the first version class loader, via an application programming interface associated with the first data cluster, the request to the first data cluster computing device.

11. The system as recited in claim 1, the operations further comprising, receiving, from a client device, at least one instruction to cause execution of the single instance of the application on the first computing device.

12. A method comprising:
sending, by a first computing device, based at least in part on information in a first library version, to a first data cluster computing device associated with the first data cluster, a request for first data, wherein the first computing device is configured to communicate over a network with a plurality of data cluster computing devices associated with a plurality of data clusters, wherein a first data cluster of the plurality of data clusters is configured with a first version of data cluster software including the first library version, and wherein a second data cluster of the plurality of data clusters is configured with a second version of data cluster software including a second library version that is different from the first library version;
receiving, by the first computing device, the first data from the first data cluster computing device; and
sending, by the first computing device, based at least in part on information in the second library version, second data that is based at least in part on the first data to a second data cluster computing device associated with the second data cluster to store the second data with the second data cluster.

13. The method as recited in claim 12, wherein a third data cluster of the plurality of data clusters is configured with a third version of data cluster software including a third library version that is different from the first library version and the second library version, the method further comprising:
receiving, by the first computing device, as the first data, a row of data from a data structure stored by the first data cluster;

sending, by the first computing device, based at least in part on information in the third library version, to a third data cluster computing device associated with the third data cluster, a request for third data corresponding to the row of data;
receiving, by the first computing device, the third data from the third data cluster computing device; and
including, by the first computing device, the third data with the second data sent to the second data cluster computing device.

14. One or more non-transitory computer-readable media storing instructions that, when executed by one or more processors of a first computing device, configure the first computing device to perform operations comprising:
sending, by the first computing device, based at least in part on information in a first library version, to a first data cluster computing device associated with the first data cluster, a request for first data, wherein the first computing device is configured to communicate over a network with a plurality of data cluster computing devices associated with a plurality of data clusters, wherein a first data cluster of the plurality of data clusters is configured with a first version of data cluster software including the first library version, and wherein a second data cluster of the plurality of data clusters is configured with a second version of data cluster software including a second library version that is different from the first library version;
receiving, by the first computing device, the first data from the first data cluster computing device; and
sending, by the first computing device, based at least in part on information in the second library version, second data that is based at least in part on the first data to a second data cluster computing device associated with the second data cluster to store the second data with the second data cluster.

15. The one or more non-transitory computer-readable media as recited in claim 14, wherein a third data cluster of the plurality of data clusters is configured with a third version of data cluster software including a third library version that is different from the first library version and the second library version, the operations further comprising:
receiving, by the first computing device, as the first data, a row of data from a data structure stored by the first data cluster;
sending, by the first computing device, based at least in part on information in the third library version, to a third data cluster computing device associated with the third data cluster, a request for third data corresponding to the row of data;
receiving, by the first computing device, the third data from the third data cluster computing device; and
including, by the first computing device, the third data with the second data sent to the second data cluster computing device.

* * * * *